(12) United States Patent
Russell, II et al.

(10) Patent No.: US 6,404,437 B1
(45) Date of Patent: Jun. 11, 2002

(54) NUCLEAR REACTOR CORE PERFORMANCE DATA VISUALIZATION SYSTEM

(75) Inventors: William E. Russell, II, Wilmington; Ralph J. Reda, Wrightsville Beach, both of NC (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/393,290

(22) Filed: Sep. 10, 1999

(51) Int. Cl.[7] .......................... G06T 13/00; G21C 7/00; G21C 7/36; G06F 17/50
(52) U.S. Cl. ..................... 345/473; 345/736; 345/757; 376/245; 376/254
(58) Field of Search ................................ 376/245, 260, 376/266, 915, 911, 914, 207, 216, 217, 247, 249, 277, 385, 428, 432, 434, 435, 436, 448; 345/619, 621–622, 650, 653, 654, 655, 664, 665, 679, 680, 473, 722, 736, 735, 848, 850, 757, 756, 771, 772, 852, 474

(56) References Cited

U.S. PATENT DOCUMENTS

| | | | | |
|---|---|---|---|---|
| 5,309,485 A | * | 5/1994 | Chao | 376/215 |
| 5,377,247 A | * | 12/1994 | Yoshioka et al. | 376/428 |
| 5,519,740 A | * | 5/1996 | Chao | 376/216 |
| 5,619,433 A | * | 4/1997 | Wang et al. | 703/18 |
| 5,638,413 A | * | 6/1997 | Uematsu et al. | 376/245 |
| 5,790,616 A | | 8/1998 | Jackson | |
| 5,790,618 A | | 8/1998 | Fawks, Jr. | |
| 6,097,399 A | * | 8/2000 | Bhatt | 345/440 |
| 6,310,929 B1 | * | 10/2001 | Hirukawa | 376/245 |

OTHER PUBLICATIONS

Cheng, Bo; A code for analyzing coolant and offgas activity in a light water nuclear reactor; Jun. 1998, p. 160.*
Agee, Lance; International Retran Conference 1998; Nuclear Power Group; Dec. 24, 1998; p. 500.*

Cheng, Bo; A code for analyzing coolant and offgas activity in a light water nuclear reactor; Jun. 1998, p. 160.*
Agee, Lance; International Retran Conference 1998; Nuclear Power Group; Dec. 24, 1998; p. 500.*

* cited by examiner

*Primary Examiner*—Matthew Luu
*Assistant Examiner*—Wesner Sajous
(74) *Attorney, Agent, or Firm*—Nixon & Vanderhye P.C.

(57) ABSTRACT

A nuclear reactor core performance data visualization system provides a method and apparatus for extracting and visually displaying large amounts of numerical performance data acquired from an operational nuclear reactor or from a nuclear reactor core simulator. The visualization system apparatus includes a color display device, a digital computer having a data storage memory, and one or more data communications links for communicating with reactor core sensors and/or other computers. After acquiring performance parameter data, the visualization system computer extracts selected performance data and constructs two distinct data arrays in memory that are used in creating formatted files for generating specific types of visual displays. A first data array, containing time-varying reactor performance parameter data corresponding to the performance of reactor core elements in two dimensions over a predetermined duration of time, is used, to create digital image animation files for displaying dynamic color-coded graphics, including reactor core element diagrams and multi-ordinate graphs. Once animated, the displayed graphics allow the user to view a time-wise evolution of the changing numerical values for selected core parameters and other time-dependent variables. A second data array, containing spatially-related core performance parameter data corresponding to performance of reactor core elements in three dimensions at one or more selected point(s) in time, is used to create virtual reality modeling language (VRML) files for displaying a virtual 3-D color-coded reactor core model that can be manipulated in three dimensions by the viewer.

19 Claims, 5 Drawing Sheets

(3 of 5 Drawing Sheet(s) Filed in Color)

NUCLEAR REACTOR CORE PERFORMANCE DATA VISUALIZATION SYSTEM

TECHNICAL FIELD

The invention relates generally to nuclear reactor and, more particularly, to a method and apparatus for extracting and visually displaying core performance data from either a nuclear reactor core simulator or an operating nuclear reactor.

COPYRIGHT NOTICE

A portion of the disclosure of this patent document contains material that is subject to copyright protection. The copyright owner has no objection to the facsimile reproduction by anyone of this patent document or the patent disclosure as it appears in the Patent and Trademark Office patent prosecution file or records, but otherwise reserves all copyright rights whatsoever.

BACKGROUND OF THE INVENTION

In the process of making key decisions concerning the design, licensing and operation of nuclear power plants many reactor core performance parameters, such as Minimum Critical Power Ratio (MCPR) and Linear Heat Generation Rate (LHGR), must be carefully examined and studied by engineers and nuclear plant operators. Access to performance parameter data is important because these parameters reflect the continually changing thermal-hydraulic and thermal-mechanical conditions of the various elements which make up a reactor core—such as, for example, the many fuel rod bundles and control blades. However, due to the dynamic nature of these parameters throughout a typical 18-month core cycle (one core "cycle" being the period of time after which one-third of the fuel bundles are due to be replaced), review of a vast amount of time-dependent performance parameter data may be required to adequately identify potential design or operational problems for any particular reactor core.

Traditionally, measured (or simulated) reactor core performance parameter data is printed or displayed as numerical values in the form of tables and simple two-dimensional graphs. Due to the complexity of the engineering concepts involved, the examination and interpretation of time-varying, dynamic, multi-dimensional reactor performance data presented in this static form requires highly trained technical personnel having extensive knowledge and experience with nuclear reactor design, licensing requirements and operational limits. Moreover, partially due to the large amount of information, it is often an extremely laborious and time-consuming endeavor that can easily consume hundreds of costly man-hours. In addition, because of the traditional dependence on static numeric tables and non-animated two-dimensional graphs to portray information relating to time-varying three-dimensional parameters, reactor core performance is both difficult to analyze and prone to misinterpretation.

Consequently, it would be desirable to be able to efficiently present complex nuclear engineering problems involving the review of large amounts of nuclear reactor performance data using a more intuitive manner of data presentation. In addition, it would be desirable to perform time-consuming evaluations of reactor core operating parameters using a more intuitive manner of data presentation. It would also be desirable to have an efficient and intuitive means for evaluating both the efficiency and quality of design of newly proposed and/or existing nuclear reactor core element configurations. In this regard, the present invention attempts to accomplish these objectives and overcome the inefficiencies of traditional approaches toward presenting and reviewing reactor performance data by providing specific data visualization tools that will enable nuclear engineers and reactor plant operators to view selected time-varying reactor core parameters as three-dimensional animation sequences, dynamic two-dimensional contour plots and manipulatable three-dimensional objects in a virtual reality environment.

DISCLOSURE OF THE INVENTION

Since the operational parameters of a reactor core vary over time, the use of digital animation and three-dimensional representations to display the time-varying behavior of multiple nuclear core performance parameters can significantly reduce the decision-making time required in determining core operational limits or in evaluating new core designs. In an exemplary embodiment of the invention, a reactor core performance visualization system is provided that allows plant operators and engineers to view selected time-varying core parameters as three-dimensional animation sequences, dynamic two-dimensional contour plots or as a manipulatable image object in a virtual reality environment. Consequently, the present disclosure is directed toward a method and system for acquiring, extracting and visually displaying core performance data obtained from either an operating nuclear reactor core or a nuclear reactor core simulator.

The reactor core performance visualization system of the present invention includes a data processor (which may be, for example, an Intel Pentium™ type processor found in conventional desktop personal computer systems) having a large data storage capacity and a color monitor or other display device capable of handling multi-color graphics. Initially, the performance visualization system acquires pertinent reactor core performance data from, for example, a reactor process control computer or a nuclear reactor core simulator via a communications link. Alternatively, the method and apparatus of the present invention could be incorporated as a part of a reactor process control computer or a reactor core simulation computer. Different types of reactor core performance data are identified, separated and organized into two separate data arrays stored in the visualization system computer memory. A first data array is constructed of spatially-related time-varying performance parameter data corresponding to reactor elements in two dimensions and organized, for example, according to its associated two-dimensional core location coordinate information (x, y). A second data array is constructed of spatially-related reactor core performance parameter data corresponding to performance of reactor elements in three dimensions at one or more selected point(s) in time and organized, for example, according to its associated three-dimensional spacial location coordinate (x, y, z) within the core.

The visualization system then utilizes data from the first array to create digital animation display files for illustrating the time-wise evolution of the reactor core performance parameters. These files are preferably formatted using a conventional digital protocol for creating digital image animation files such as, for example, Microsoft Corporation's audio visual interleave (AVI) file protocol. In a similar manner, the three-dimensional spatially-related information stored in the second data array is used to generate virtual reality modeling language (VRML) protocol files. These VRML files are used by the visualization system to display a three-dimensional (3-D)model of a portion of a reactor core, portraying the 3-D configuration of fuel and control elements within the core, the viewing perspective of which may be manipulated by the viewer. The use of AVI and VRML protocol files in the present invention further allows for the easy and convenient transmission and exchange of reactor core performance information between parties using computers having conventional World Wide Web browser software (with the appropriate VRML and AVI software plug-ins), and communicating either over a local network or over larger distances via the internet.

Utilizing one feature of the present invention, a reactor plant operator or engineer can view 2-D animated color-coded diagrams that both illustrate the positional configuration of elements within the core and indicate the value of the selected performance parameter for each element. Information is displayed for indicating the current burn cycle "exposure" time of a particular core element and the location in the core where operational or regulatory limits have been or will be exceeded. In this manner, any actual or potential violation of predetermined core operating limits can be easily and quickly identified visually. Utilizing another feature of the present invention, a reactor plant operator or engineer can control the view and orientation of a displayed 3-D virtual reality model of a reactor core to examine performance parameters of multiple core elements simultaneously. In addition, the virtual reality 3-D display feature of the visualization system can be operated so as to provide a simulated visual "fly-through" or "fly-around" tour of the reactor core. For these and other reasons apparent from the discussions of the best mode of the invention below, the present invention provides a much needed and more intuitive 3-D visualization tool for evaluating critical core safety and performance parameter data.

BRIEF DESCRIPTION OF THE DRAWINGS

The file of this patent contains at least one drawing executed in color. Copies of this patent with color drawings will be provided by the Patent and Trademark Office upon request and payment of the necessary fee.

BEST MODE FOR CARRYING OUT THE INVENTION

In an exemplary embodiment of present invention, the data visualization system is configured to run as a software application under MicroSoft's Windows95 or 98™ operating system. In this manner, a user may enter various performance parameter selection criterion and visualization system commands for manipulating displayed images via keyboard or, for example, a point-and-click desk-top mouse input device.

Figure 1:
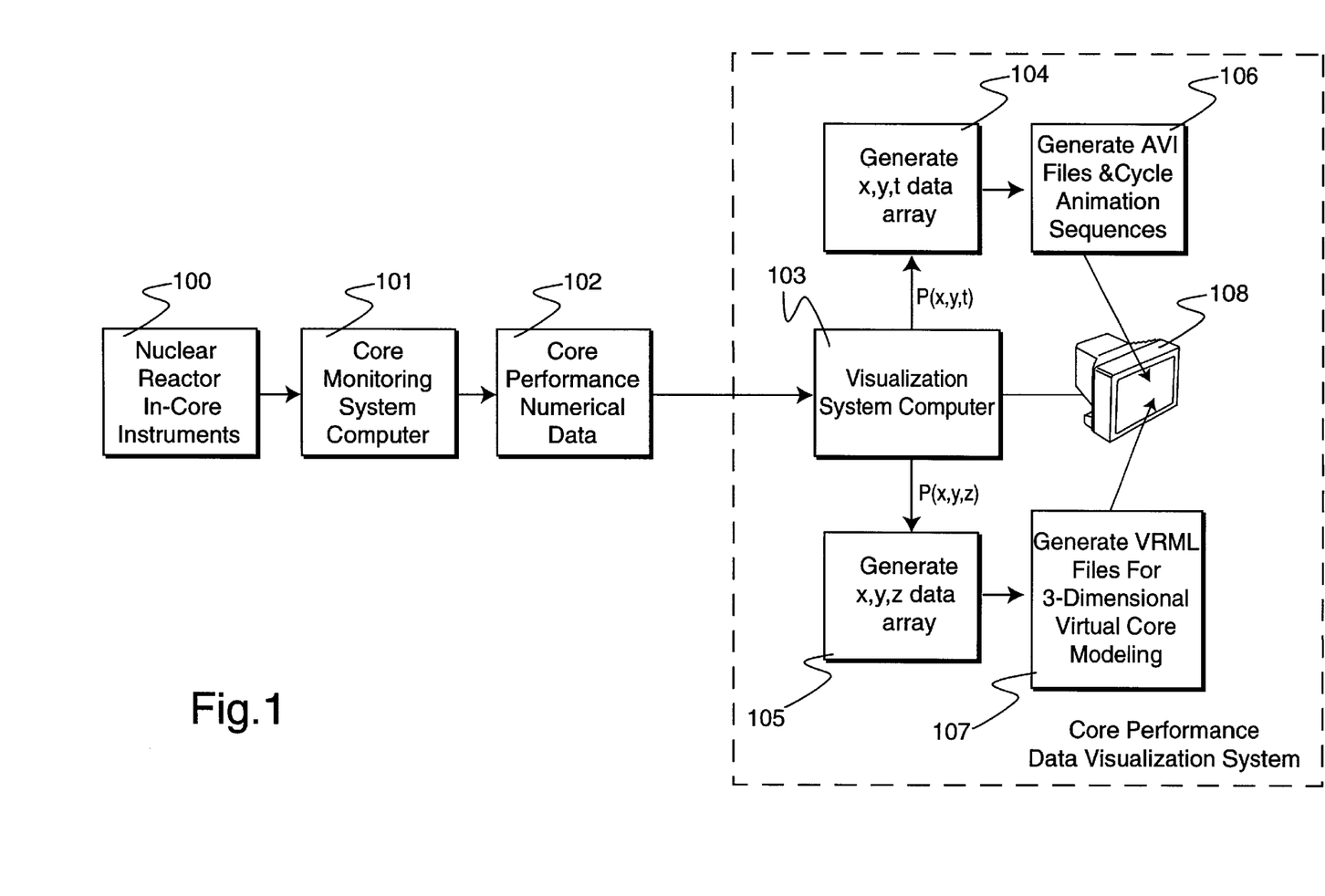
FIG. 1 is a block diagram of the reactor core performance visualization system illustrated in an arrangement for processing data from an operating nuclear reactor core.

Referring now to FIG. 1, the core performance data visualization system of the present invention is described in the context of communicating with an operational nuclear reactor. As indicated in block 100, sensors and instrumentation located in an operational nuclear reactor core (not shown) provide real-time measurement data to some sort of reactor control computer or, for example, to a reactor core monitoring system computer 101. Numerical core performance data acquired by core monitoring system computer 101 is provided to the data visualization system of the present invention via a digital communications channel 102. The visualization system apparatus includes a digital computer or central processing unit 103, preferably having a large data storage capacity including both working RAM and archival storage, input devices such as a keyboard and a mouse (not shown), and a high resolution color display device 108. Upon acquiring all pertinent core performance data from core monitoring system computer 101, visualization system computer 103 constructs two distinct data arrays, 104 and 105, in memory from temporal and spatially-related core performance data. These two data arrays are then used in creating specially formatted files for generating different types of visual displays viewable on system monitor 108.

In an exemplary embodiment of present invention, the data visualization system uses VRML and creates AVI files. Both VRML programs and the AVI file protocol are well known. Likewise, VRML and AVI authoring/viewing software is commonly available from commercial software developers, either as shareware or as packaged products. Moreover, although the data visualization system of the present invention uses conventional AVI and VRML file protocols, other multimedia file protocols could be employed in the present invention for constructing and viewing the animation and 3-D image files.

Referring again to FIG. 1, data array 104 is constructed in computer memory by visualization system computer 103 from 2-D (two-dimensional) spatially-related time-varying core performance parameter data, P(x,y,t), received from core monitoring computer 101. This data includes various different performance parameter values associated with each element in the core and is indexed within array 104 according to a time value (elapsed real or exposure time) and a two-dimensional location coordinate for the particular core element. Visualization system computer 103 then uses the P(x,y,t) data to create AVI digital image animation files 106 for displaying a variety of dynamic color-coded graphics, such as reactor core element diagrams and multi-ordinate graphs. Conventional AVI file viewing software, resident in the visualization system computer memory, is used to access animation files 106 and display the animated 2-D color coded graphics on display device 108. The animated graphics allow the user, for example, to simultaneously view the time-wise numerical evolution of core performance parameter values (and/or other multiple variable-dependent data) for one or more elements in the reactor core.

Preferably, the visualization system of the present invention utilizes the conventional MicroSoft Windows™ operating system environment to provide a user-friendly interface having parameter and display selection menus (not shown) to allow the viewer to select from a variety of display arrangements. For example, in accordance with the present invention, a user may select a display arrangement having multiple animated graphics for tracking several performance parameters simultaneously or a display arrangement showing only a single animated graphic of a ¼-core diagram illustrating the time-wise evolution of a selected parameter.

Another data array 105 is formed in system memory from 3-D (three-dimensional) spatially-related core performance parameter information, P(x,y,z), that was or is indicative of the state of the reactor core at a selected point(s) in time. This information includes performance parameter data and/or core configuration information indexed within array 105 according to its three-dimensional spacial location coordinate of origin within the core. The P(x,y,z) data in array 105 is then formatted by visualization system computer 103 into virtual reality modeling language (VRML) files 107. Conventional VRML file viewing software, resident in the visualization system computer memory, is used to access VRML files 107 and display a virtual 3-D color-coded reactor core model image that can be manipulated in three dimensions by the viewer. Alternatively, the AVI and VRML files of the present invention can be viewed using a computer running a conventional memory-resident World Wide Web browser (e.g., Netscape Communicator4.51™) with the appropriate AVI or VRML "plug-in" (e.g., Netscape's avi plug-in DLL NPAVI32 or VRML World's Cosmo Player 1.0).

Figure 2:
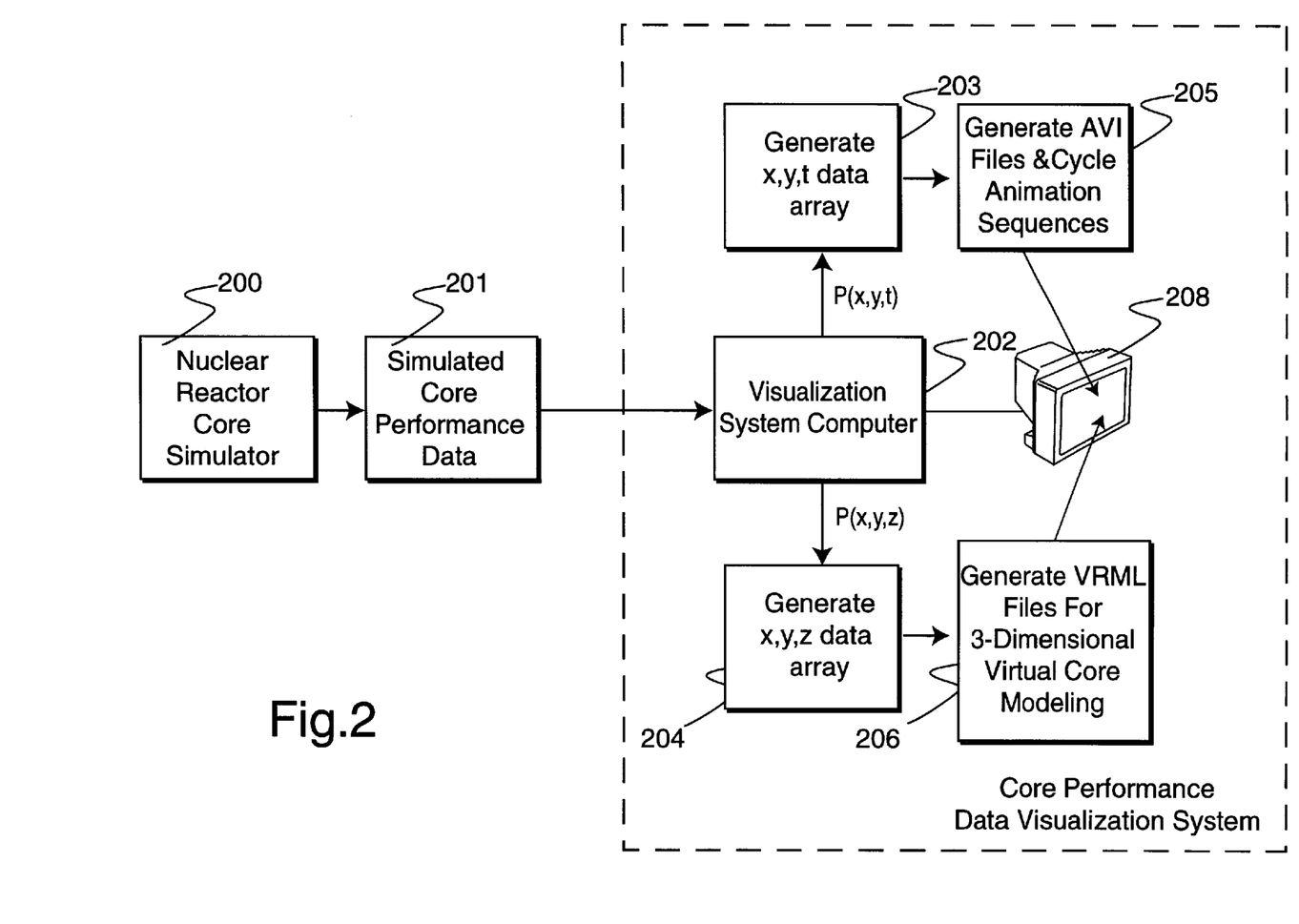
FIG. 2 is a block diagram of the reactor core performance visualization system illustrated in an arrangement for processing data from a nuclear reactor core simulator.

In FIG. 2, an alternate embodiment of the reactor core performance visualization system of the present invention is shown in the context of obtaining performance data from a reactor core simulator. In this embodiment, a nuclear reactor core simulator computer, 200, provides simulated core performance parameter data via data channel 201 to the core performance data visualization system. Just as described above with respect to FIG. 1, visualization computer 202 selects and organizes this data into two separate arrays, 203 and 204, which are then used to respectively create AVI animation files 205 and VRML files 206 for producing a visual image(s) on display device 208.

Figure 3:
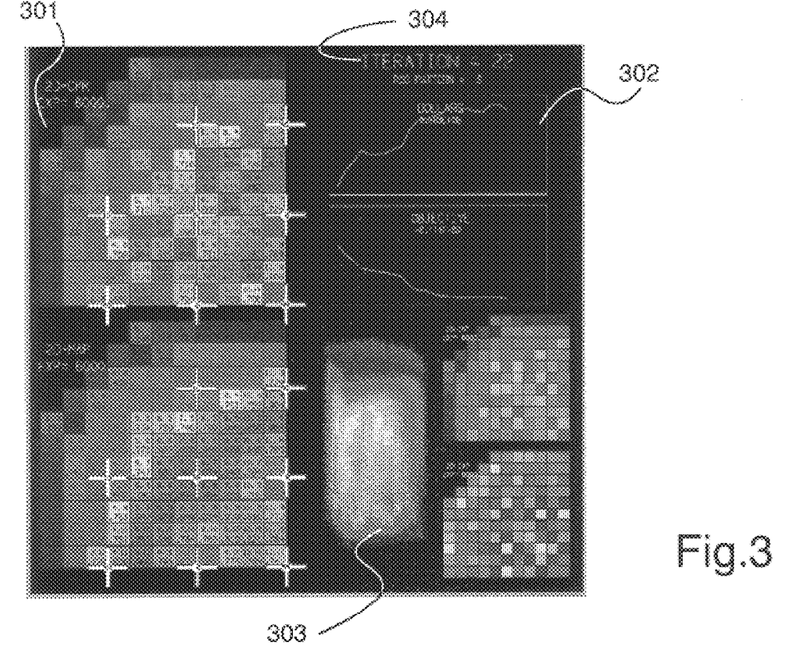
FIG. 3 is an example computer display screen image of a single frame from a reactor core performance animation sequence.

FIG. 3 shows a single frame of an example animation sequence generated by the reactor core performance visualization system computer. In a preferred embodiment, spatially-related time-varying data, P(x,y,t), for one or more selected reactor core performance parameters (e.g., MAPLHGR, MFLPD and CPR) are displayed as animated color-coded graphics in which colors and indicia change during the animation sequence to reflect the changing conditions within the core over a predetermined passage of time or sequence of events. In a preferred embodiment, the animated display images include one or more color-coded reactor core configuration diagrams, 301, one or more two-dimensional graphs/contour plots, 302, and a two-dimensional color-coded perspective image of the reactor core 303. Each core configuration diagram 301 consists of a ¼-core representation of the arrangement of fuel bundles and control blades as viewed from the top of the reactor looking down into the core. The range of colors used by the visualization system in displaying the various diagrams and graphics are set to correspond to the range of numerical values possible for the particular performance parameter(s) selected for display.

Figure 4:
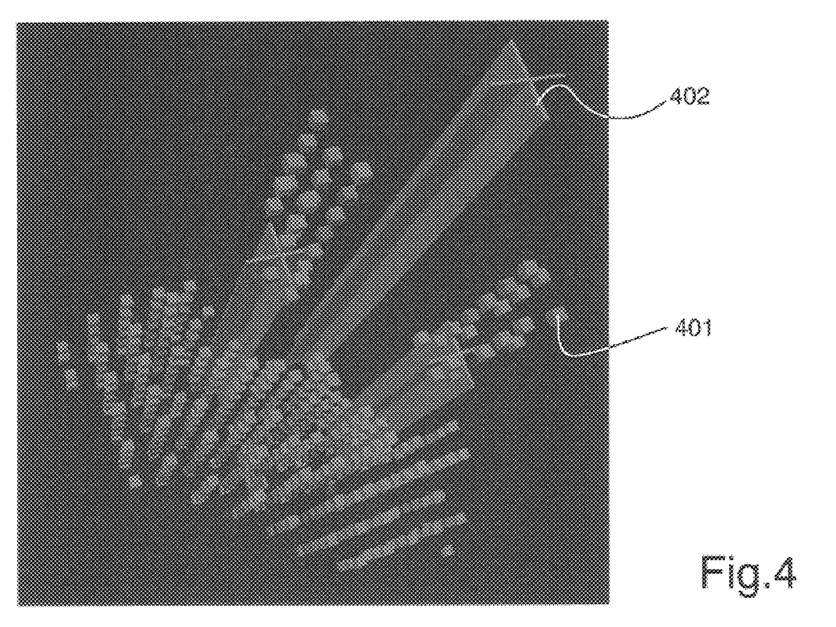
FIGS. 4–6 are example computer display screen images of a 3-D virtual reality model of a nuclear reactor core.
Figure 5:
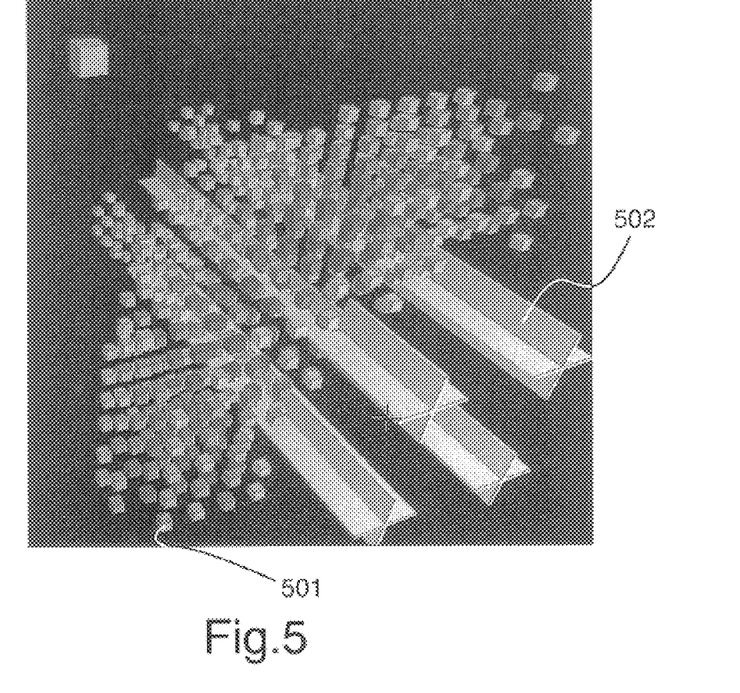
Figure 6:
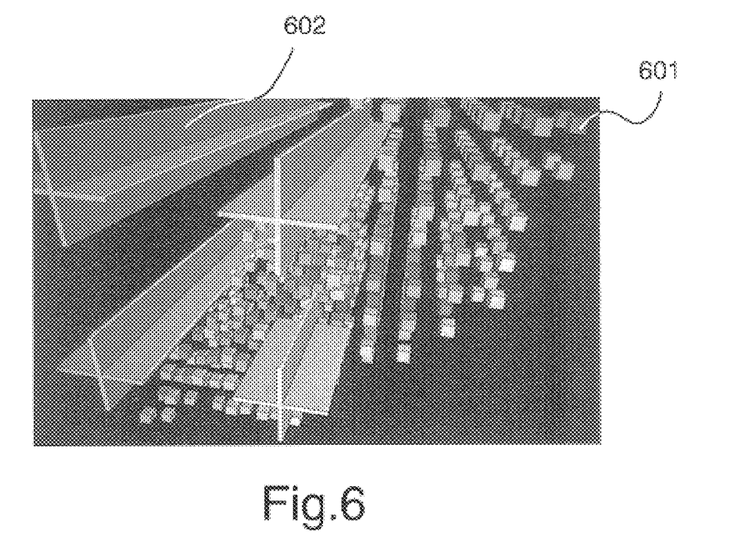

FIGS. 4 through 6 show several example computer display screen images of a 3-D virtual reality model of a nuclear reactor core created from VRML files containing P(x,y,z) core performance data. In this example embodiment, control blades are represented by cross-beam FIGS. 402, 502, 602 and fuel bundles are represented by vertical strings of color-coded cubes or blocks 401, 501, 601. The displayed color of each block is indicative of a numerical value or range for a selected performance parameter. In a preferred embodiment, the color of a particular block is indicative of the power being produced at a corresponding physical portion of the fuel bundle, e.g., "hotter" high-power portions are represented by red shades and "cooler" low-power portions by blue shades.

Figure 7:
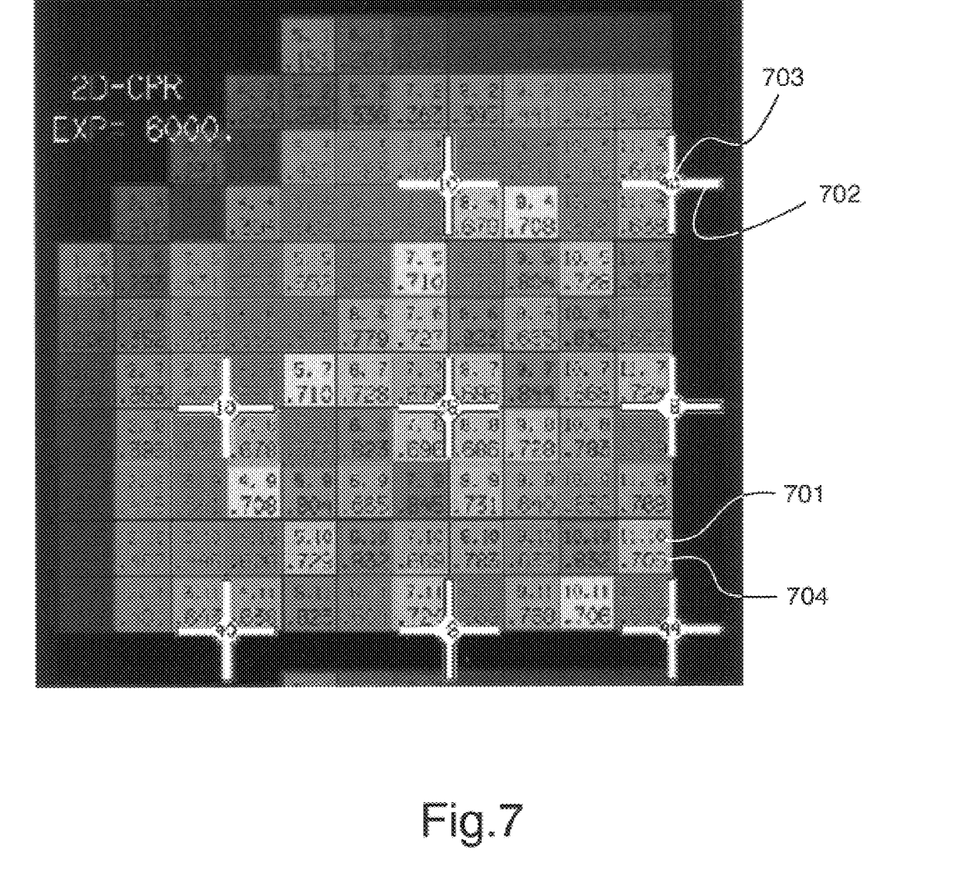
FIG. 7 is an enlarged view of a portion of the display screen image of FIG. 3 showing a ¼-core diagram for illustrating dynamic performance parameters of reactor core fuel bundles and control blades.

FIG. 7 shows an enlarged view of a portion of the display screen image of FIG. 3 showing a ¼-core diagram illustrating one of the dynamic performance parameters for the reactor core. A color-coded multi-square diagram represents the physical configuration (as viewed from above) of fuel bundles and control blades within a one-quarter section of a reactor core. Indicia identifying the particular performance parameter data selected for display by the viewer (e.g., CPR) is provided in the upper left-hand corner of the diagram. Immediately below the parameter identification, a numerical value indicative of the elapsed "exposure" (or "burn") time of the represented elements within the reactor core is displayed, e.g., a value representing units of elapsed time in the current burn cycle. Square color-coded boxes 700 represent fuel bundles and cross-like symbols 702 represent control blades. The color of each box or block is representative of the power produced by the fuel bundle at the current exposure time. Each box 700 also contains x and y location indicia 701 indicative of its position relative to other bundles in the core. Another (larger) numerical indicia 704 indicates the value of the currently selected performance parameter (e.g. CPR) associated with the particular fuel bundle. The cross-like symbols 702 representing control blades include central numeric indicia 703 that represent the vertical height of the control blade within the reactor core. Since the numerical values for various characteristics are time dependent, the displayed indicia are dynamic and will change during the animation sequence.

The above described visualization system and method for presenting nuclear reactor core performance data is believed to be applicable to a wide range of reactors and core lading arrangements for reducing the man-hours of decision-making time required in determining core operational limits and evaluating nuclear core designs. In addition, the visualization system of the present invention is not intended to be limited solely to the use of the AVI protocol or VRML for creating animation of 3-D virtual reality modeling files from the acquired performance parameter data. In practice, any other conventional animation file protocol and/or 3-D virtual reality modeling software could be used in conjunction with the present invention by creating files of the appropriate protocol and format from the data stored in arrays 104/203 and 105/206.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A method for visually presenting nuclear reactor core performance data as animated two-dimensional graphics and/or three-dimensional images on a video display monitor coupled to a computer system, comprising the steps, executed by the computer system, of:

a) acquiring nuclear reactor core performance data from an operational nuclear reactor and/or from a nuclear reactor computer simulation/optimization system;

b) creating in computer memory a first data array comprising time-varying reactor core performance parameter data acquired in step (a);

c) creating in computer memory a second data array comprising spatially-related core performance parameter data acquired in step (a), said core performance parameter data corresponding to one or more selected points in time;

d) formatting time-varying reactor core performance parameter data acquired over a predetermined period of time into one or more image animation files, information in said image animation files being displayable on a video monitor as one or more video image frames either singly or sequentially to form an animated image;

e) formatting spatially-related core performance parameter data corresponding to one or more selected points in time into one or more virtual reality model image files, information in said virtual reality model image files being displayable on a video monitor as a 3-D image; and f) displaying on said video monitor one or more animated graphics and/or a three-dimensional model virtual image representation of a reactor core from information stored in said image animation files and said virtual reality model image files.

2. The method of claim 1 wherein the one or more animation files are formatted in accordance with AVI protocol.

3. The method of claim 1 wherein the one or more virtual reality modeling files are formatted in accordance with a conventional VRML protocol.

4. A method for visually presenting nuclear reactor core performance information as animated two-dimensional graphics and three-dimensional images, comprising the steps, executed by a computer, of:

storing nuclear reactor core performance data, said data comprising spatially-related and temporally-related core performance parameter data acquired directly from an operational reactor or from another computer system via a communications link;

generating a first data array comprising time-varying reactor core performance parameter data corresponding to reactor core elements in two dimensions acquired over a predetermined duration of time;

generating a second data array comprising spatially-related core performance parameter data corresponding to reactor core elements in three dimensions acquired at one or more selected point(s) in time;

formatting data from the first data array into one or more image animation files in accordance with an AVI protocol, information in said image animation files being displayable as one or more video image frames either singly or sequentially;

formatting data from the second data array into one or more 3-D virtual model image files in accordance with a VRML protocol; and providing to a display device information from said image animation files or information from said 3-D virtual model image files for displaying one or more animated graphics illustrating a time-wise evolution of core performance parameters and/or an image of a three-dimensional virtual model of a reactor core.

5. The method of claim 4 wherein the one or more animation files are formatted in accordance with AVI protocol.

6. The method of claim 4 wherein the one or more virtual reality modeling files are formatted in accordance with a conventional VRML protocol.

7. A system for displaying nuclear reactor core performance data, said system comprising a computer including a storage memory and I/O devices including a graphics display device, said computer programmed to:

(i) format time-varying reactor core performance parameter data acquired over a predetermined period of time into one or more image animation files;

(ii) format spatially-related reactor core performance parameter data corresponding to one or more selected points in time into one or more virtual reality model image files; and (iii) display information from said image animation files and/or said virtual reality model image files on said graphic display device.

8. The system of claim 7 wherein the computer includes a user interface input device and executable program instruction means for enabling a viewer to control a displayed perspective and viewing position of a 3-D virtual reality model image based on information from one or more of said virtual reality model image files.

9. The system of claim 7 wherein an animation sequence play-back rate of displayed image animation file information may be selected and controlled by a viewer.

10. The system of claim 7 wherein a displayed 3-D perspective and/or viewing position of displayed virtual reality model image file information may be selected and controlled by a viewer.

11. The system of claim 7 wherein a three-dimensional virtual model image and/or displayed animated graphics comprise color-coded portions such that a predetermined range of displayed color frequencies correspond to a predetermined range of values for a selected performance parameter.

12. The system of claim 7 wherein information displayed from said animation files produce animated graphics including a diagram of reactor core elements and/or multi-ordinate graphs.

13. The system of claim 7 wherein the one or more animation files are formatted in accordance with AVI protocol.

14. The system of claim 7 wherein the one or more virtual reality modeling files are formatted in accordance with a conventional VRML protocol.

15. A computer program embodied on a computer-readable medium for displaying nuclear reactor core performance and configuration information, comprising:

means for formatting time-varying reactor core performance parameter data acquired over a predetermined period of time into one or more image animation files;

means for formatting spatially-related core performance parameter data corresponding to one or more selected points in time into one or more virtual reality model image files; and means for displaying information from image animation files and/or virtual reality model image files on a display device.

16. A nuclear reactor core performance data visualization system for displaying time-varying reactor core performance parameters comprising a computer connected to a color graphics display device, said visualization system having a display arrangement including an animated reactor core configuration diagram wherein reactor fuel bundles are represented by color-coded boxes labeled with numerical indicia indicative of a selected performance parameter value, and reactor control blades are represented by cross-like figures positioned between the boxes and labeled with numerical indicia representing a vertical position within a reactor core.

17. A nuclear reactor core performance data visualization system as set forth in claim 16 wherein the boxes representing fuel bundles are further labeled with indicia indicative of relative bundle position within a reactor core.

18. A nuclear reactor core performance data visualization system as set forth in claim 16 wherein relative positions of the boxes in the display arrangement correspond to positions of fuel bundles within a reactor core.

19. A nuclear reactor core performance data visualization system as set forth in claim 16 wherein indicia and color of the boxes change dynamically during display in accordance with changes in numerical value of associated performance parameters.

* * * * *